(12) United States Patent
White et al.

(10) Patent No.: US 12,351,503 B1
(45) Date of Patent: Jul. 8, 2025

(54) SYSTEM AND METHOD FOR RAPIDLY ROTATING AND TRANSFERRING MOLTEN MATERIAL AND POWDERED MATERIAL FROM A FIRST CHAMBER TO A SECOND CHAMBER IN A MICRO-GRAVITY ENVIRONMENT

(71) Applicant: REDWIRE SPACE, INC., Jacksonville, FL (US)

(72) Inventors: Robert White, Sunnyvale, CA (US); Jan Clawson, Mountain View, CA (US); Michael Snyder, Jacksonville, FL (US)

(73) Assignee: REDWIRE SPACE, INC., Jacksonville, FL (US)

( * ) Notice: Subject to any disclaimer, the term of this patent is extended or adjusted under 35 U.S.C. 154(b) by 534 days.

(21) Appl. No.: 17/576,104

(22) Filed: Jan. 14, 2022

Related U.S. Application Data

(60) Provisional application No. 63/137,935, filed on Jan. 15, 2021.

(51) Int. Cl.
   *C03B 5/225* (2006.01)
(52) U.S. Cl.
   CPC .................................. *C03B 5/2255* (2013.01)
(58) Field of Classification Search
   CPC .............................. C03B 5/2255; B29C 39/08
   See application file for complete search history.

(56) References Cited

U.S. PATENT DOCUMENTS 2,423,018 A * 6/1947 Griffoul ................ F27B 7/2083
432/13
3,938,981 A * 2/1976 St. John ................ C03B 5/2255
65/346

(Continued)

FOREIGN PATENT DOCUMENTS

CN        113754241 A  * 12/2021
DE    102017104241 A1 *  9/2018  ............. C22B 1/005

(Continued)

OTHER PUBLICATIONS

D. S. Tucker et al., "Effects of gravity on ZBLAN glass crystallization," Annals of the New York Academy of Sciences, vol. 1027, No. 1, pp. 129-137, 2004.

(Continued)

*Primary Examiner* — Erin Snelting
(74) *Attorney, Agent, or Firm* — Terry M. Sanks, Esq.; Beusse Sanks, PLLC

(57) ABSTRACT

The system comprises an enclosed centrifuge furnace with a first chamber, a second chamber and a third chamber all of which include and share a tilt axis. The third chamber is concentric with the first chamber and operable at a first temperature to melt a material within the first chamber. The second chamber is concentric with the first chamber and operable at a second temperature lower than the first temperature to cool the material within the first chamber. The system includes a first mechanism to rotate the first, second and third chambers, simultaneously, to create a centrifugal force to maintain the material within the third chamber as the centrifugal force is applied. The system includes a second mechanism to position the tilt axis at an angle which causes the melted material to pour from the third chamber into the second chamber where the material is cooled.

5 Claims, 4 Drawing Sheets

(56) References Cited

U.S. PATENT DOCUMENTS

| | | | | |
|---|---|---|---|---|
| 3,992,183 | A | * | 11/1976 | Rough .................... F16C 33/66 |
| | | | | 494/83 |
| 4,820,329 | A | * | 4/1989 | Gunthner .................. C03B 5/23 |
| | | | | 65/347 |
| 2002/0090018 | A1 | * | 7/2002 | Zebedee ............... F27B 7/2083 |
| | | | | 373/84 |
| 2015/0144284 | A1 | * | 5/2015 | Snyder ............... B22D 17/2209 |
| | | | | 164/253 |

FOREIGN PATENT DOCUMENTS

| | | | | |
|---|---|---|---|---|
| GB | 2097902 | A | * 11/1982 | ............. C22B 7/004 |
| GB | 2270371 | A | * 3/1994 | ............ F27B 14/061 |

OTHER PUBLICATIONS

P. France, Fluoride Glass Optical Fibers, Springer Science and Business Media, 2012.

T. Kanamori et al., "Study on the Nature of Extrinsic Scattering Centers in Fluoride Glass Optical Fibers," Japanese Journal of Applied Physics, vol. 25, No. 3, pp. 203-205, 1986.

M. Saad, "High purity fluoride glass synthesis: a review," Laser Refrigeration of Solids II., vol. vol. 7228. International Society for Optics and Photonics, 2009.

M. Saad, "Fluoride glass fiber: state of the art.," Fiber Optic Sensors and Applications VI, vol. vol. 7316. International Society for Optics and Photonics, 2009.

I. D. Aggarwal and G. Lu, Fluoride glass fiber optics, 1991.

S. Mitachi and T. Manabe, "Fluoride glass fiber for infrared transmission," Japanese Journal of Applied Physics, vol. 19, No. 6, p. 313, 1980.

G. Lu, I. Aggarwal and J. P. Bradley, "Noble metals as a source of continuous scattering in fluoride glasses," Journal of the American Ceramic Society, vol. 71, No. 3, pp. C-156, 1988.

K. J. Ewing and J. A. Sommers, "Purification and Analysis of Metal Fluorides for Use in Heavy Metal Fluoride Glasses," in Fluoride Glass Fiber Optics, 1991, pp. 141-211.

M. N. Brekhovskikh and V. A. Fedorov, "Purification of fluorides for optical materials synthesis," Inorganic Materials, vol. 50, No. 12, pp. 1277-1282, 2014.

M. Robinson, "Preparation and Purification of Fluoride Glass Starting Materials," Materials Science Forum., vol. 5, No. Trans Tech Publications, 1985.

D. Tran, C. Fisher and G. H. Sigel, "Fluoride glass preforms prepared by a rotational casting process," Electron. Lett. , vol. 18, p. 657-658, 1982.

S. Takahashi and H. Iwasaki, "Preform and fiber fabrication.," in Fluoride glass fiber optics, 1991, pp. 213-233.

G. E. A. Tao, "Infrared fibers," Advances in Optics and Photonics, vol. 7, No. 2, pp. 379-458, 2015.

S. Carter, J. Williams, M. Moore, D. Szebesta and S. Davey, "Prospects for ultra-low-loss fluoride fibres at BTRL," J. Non-Cryst. Solids , vol. 140, p. 153-158, 1992.

S. D. Jackson, "Towards high-power mid-infrared emission from a fibre laser," Nature photonics , vol. 6, No. 7, p. 423, 2012.

UpnaLab, "Acoustic Levitator," Autodesk Instructables, [Online]. Available: www.instructables.com/id/Acoustic-Levitator. [Accessed Jan. 2019].

M. A. P. N. &. A. J. C. Andrade, "Review of Progress in Acoustic Levitation," Brazilian Journal of Physics, vol. 48, No. 2, pp. 190-213, 2018.

B. Dunbar, "Experiments in Microgravity—Fluids," NASA Education, Jul. 7, 2014. [Online]. Available: https://www.nasa.gov/audience/foreducators/microgravity/multimedia/me-fluids.html. [Accessed Jan. 2019].

Z. Y. E. A. Hong, "Dynamics of levitated objects in acoustic vortex fields," Scientific reports, vol. 7, No. 1, p. 7093, 2017.

K. E. A. McPherson, "A Researcher's Guide to: International Space Station Acceleration Environment," National Aeronautics and Space Administration, 2015.

\* cited by examiner

SYSTEM AND METHOD FOR RAPIDLY ROTATING AND TRANSFERRING MOLTEN MATERIAL AND POWDERED MATERIAL FROM A FIRST CHAMBER TO A SECOND CHAMBER IN A MICRO-GRAVITY ENVIRONMENT

CROSS-REFERENCE TO RELATED APPLICATIONS

This application claims the benefit of U.S. Provisional Application No. 63/137,935 filed Jan. 15, 2021, and the entirety of which is incorporated by reference.

BACKGROUND

Embodiments relate to manufacturing fiber optics in a micro-gravity and, more particularly, remanufacturing a material in a micro-environment to remove impurities prior to manufacturing fiber optics.

One type of fiber optics may be made from $ZrF_4$-$BaF_2$-$LaF_3$-$AlF_3$-$NaF$ (ZBLAN) glasses. ZBLAN glasses have to be processed in very dry atmosphere in order to avoid oxyfluoride formation which will lead to glass ceramic or crystallized glass. The material is usually manufactured by the melting-quenching method. First, the raw products are introduced in a platinum crucible, then melted, fined above 800° C. and casted in metallic mold to ensure a high cooling rate or quenching which favors glass formation. Finally, they are annealed in a furnace to reduce the material thermal stresses induced during the quenching phase. This process results in large transparent pieces of fluoride glass. However, when manufactured on Earth, crystallized glass is still included within the manufactured ZBLAN glass. Currently, crystals and platinum inclusions are the greatest sources of reduced performance in the final optical fiber product. Crystals and platinum inclusions are produced by convection currents which produce crystal nucleation centers and draw the platinum contamination from the walls into the center of the preform during manufacturing on Earth.

The effects of gravity on the crystallization within ZBLAN glasses have been studied using the NASA KC-135 aircraft and a sounding rocket. Fibers and cylinders of ZBLAN glasses were heated to the crystallization temperature in unit and reduced gravity where crystallization was found to be suppressed.

Though reduced gravity has been identified as an environment to heat ZBLAN glasses where crystallization is suppressed, a precise system and method to produce suppressed crystallization have not been developed. An aspect of the system and method may include a centrifuge. Earth-based centrifuges provide for pouring from a crucible to a mold being done by hand wherein difference in pouring speed and style may affect a final product. Pouring in a zero-gravity environment is not a safe process as the liquid ZBLAN may contaminate surrounding areas as there is no control over where the liquid ZBLAN may go. Therefore, manufacturers and users of ZBLAN glasses would benefit from a centrifuge that functions in micro-gravity to repeatedly suppress crystallization within glass-based material that may be used to create a fiber strand.

SUMMARY

Embodiments relate to a system, furnace, and a method for removing impurities from a material while in a gravitational environment that is less than Earth gravity. The system comprises an enclosed centrifuge furnace with a first chamber, a second chamber and a third chamber all of which include and share a tilt axis. The third chamber is concentric with the first chamber and operable at a first temperature to melt a material within the first chamber. The second chamber is concentric with the first chamber and operable at a second temperature lower than the first temperature to cool the material within the first chamber. The system includes a first mechanism to rotate the first, second and third chambers, simultaneously, to create a centrifugal force to maintain the material within the third chamber as the centrifugal force is applied. The system includes a second mechanism to position the tilt axis at an angle which causes the melted material to pour from the third chamber into the second chamber where the material is cooled.

The furnace includes a first chamber, a second chamber, and a third chamber all of which include and share a tilt axis. The third chamber is concentric with the first chamber and operable at a first temperature to melt a material within the first chamber. The second chamber is concentric with the first chamber and operable at a second temperature lower than the first temperature to cool the material within the first chamber. The furnace includes an enclosure for enclosing the first chamber, the second chamber and the third chamber.

The method includes heating a powdered material in a first chamber at a first temperature by an enclosed centrifuge furnace. The furnace has the first chamber, a second chamber and a third chamber all of which include and share a tilt axis. The third chamber is concentric with the first chamber and operable at the first temperature to melt the material within the first chamber. The method includes rotating the furnace by a first mechanism to rotate the first, second and third chambers, simultaneously, to create a centrifugal force to maintain the material within the third chamber as the centrifugal force is applied. The method includes pouring the melted material from the third chamber into the second chamber. The method includes heating the material to a second temperature by the second chamber. The second chamber is concentric with the first chamber and the second temperature lower than the first temperature. The method includes cooling the material within the first chamber.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
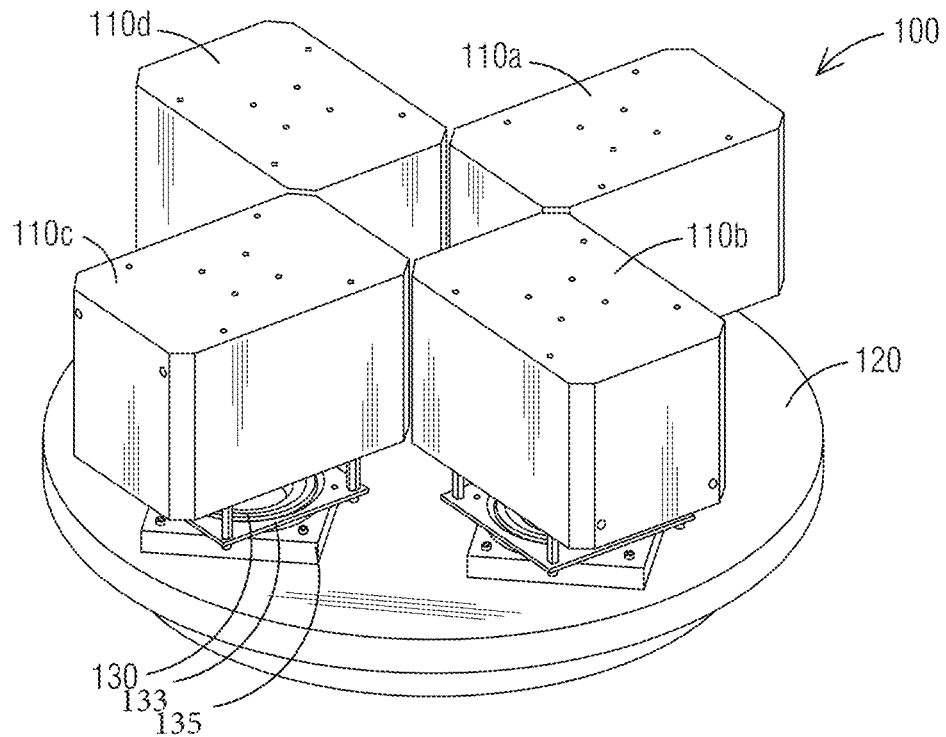
FIG. 1 shows an embodiment of a plurality of centrifuge powder furnaces mounted on a centrifuge plate.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Though embodiments herein may specifically refer to ZBLAN, the embodiments may be applicable to other materials where their properties may be enhanced. More specifically, crystals and platinum inclusions are particular sources of reduced performance in the final optical fiber product for ZBLAN. Other materials may have similar defects that affect the performance. By producing the preforms used for fiber pulling in reduced gravity the subject inventors believe this will reduce convection currents which produce crystal nucleation centers and draw the platinum contamination from the walls into the center of a preform. With the reduction in convection materials (in this example ZBLAN) quality can increase closer to a theoretical maximum of a particular material.

Figure 2:
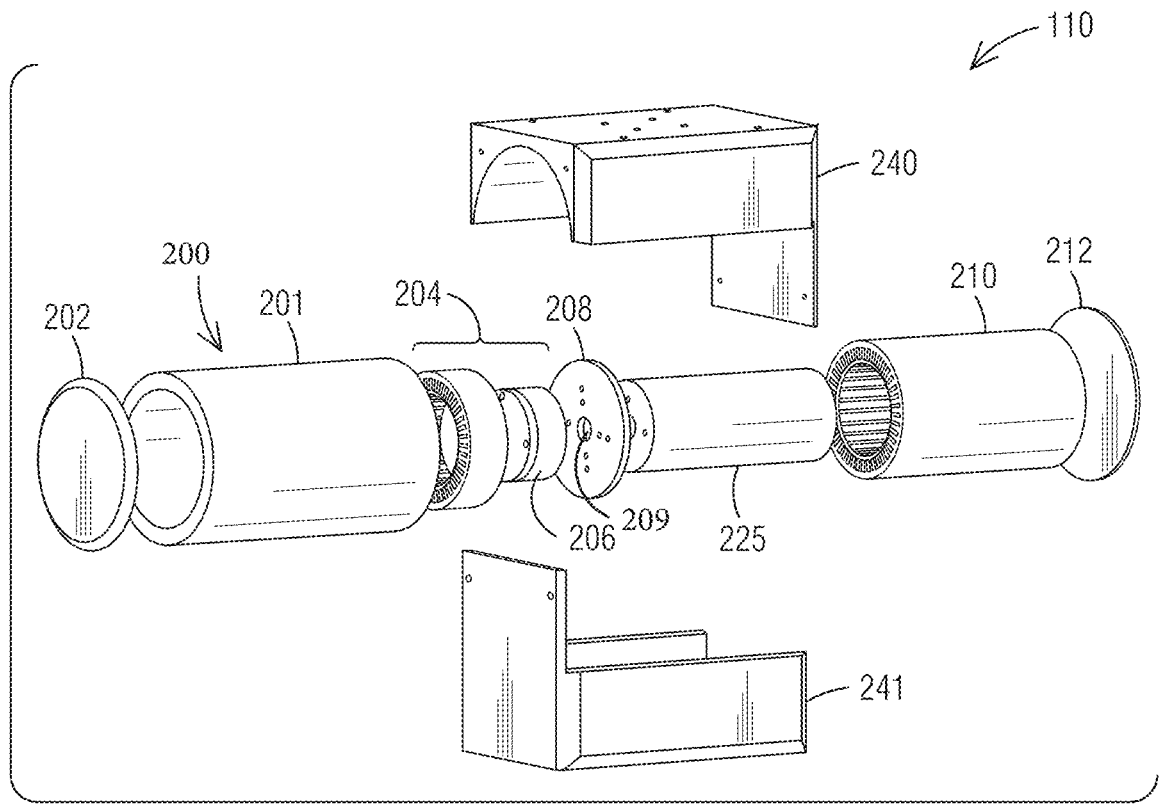
FIG. 2 shows an exploded view of an embodiment of a centrifuge powder furnace.

FIG. 1 shows an embodiment of a plurality of centrifuge powder furnaces 110a, 110b, 110c and 110d mounted on a centrifuge plate 120. As shown, a furnace system 100 may have a plurality of furnaces 110a, 110b, 110c and 110d such as, but not limited to, four centrifuge powder furnaces. Though a plurality of furnaces is shown, an embodiment of the furnace system 100 may have a single furnace 110 (FIG. 2). Each furnace 110 may be enclosed and individually mounted to a centrifuge plate 120. The centrifuge plate 120 may rotate to provide a desired amount of centrifugal force. Though not shown, agitators may be provided to ensure proper, or complete mixing and pouring taking place when material moves from a first chamber to a second chamber of the furnace. One or more agitators may be provided to move, or agitate, each individual furnace or the centrifuge plate which results in all furnaces being moved at the same time. For pouring, the one or more agitators may lift the desired furnace to a height to allow for the ZBLAN to be poured. In some embodiments, an agitator of the system 100 may include a lifting and lowering mechanism 130, as will be described later. An example, furnace 110 will now be described. The enclosure (i.e., casing 240, 241) is configured to be rotated to create a centrifugal force within one or more of the first chamber, the second chamber and the third chamber.

FIG. 2 shows an exploded view of an embodiment of a centrifuge powder furnace. As shown, the furnace 110 has at least a first chamber 200 and a second chamber 210. Also shown, the first chamber 200 may include a ceramic insulation body 201. A first insulation cap 202 may be provided at a first side or first open end of the ceramic insulation body 201 of the first chamber 200. The first open end is shown on the farthest left of the page. A heater crucible 204 is configured to be received in the first chamber 200. A mold body 225 is provided. The mold body 225 may fit within the second chamber 210. The second chamber 210 may be considered the heater mold. A second insulation cap 212 may be provided at the first opening of the second chamber 210, shown on the farthest right of the page. The second insulation cap 212 may also be an end cap of the first chamber 200 such that a second side or the second open end of the ceramic insulation body 201 may be insulated and closed.

As shown, the first side of the first chamber 200 is closed by insulation cap 202. The second side of the first chamber 200 is diametrically opposing the first side of the first chamber 200 and is closed by insulation cap 212.

The insulation caps 202 and 212, first chamber 200, a separating spacer 208, mold body 225, and second chamber 210 may be made of a ceramic material. A casing 240, 241 may be provided to enclose the first chamber 200 and the second chamber 210. Between the heater crucible 204 and the mold body 225, the separating spacer 208 may be provided. The casing may include a first casing member 240 and a second casing member 241, which together form a cavity or enclosure for the placement of the first chamber 200, the second chamber 210 and the mold body 225 in concentric relation.

The first chamber 200, the second chamber 210, the heater crucible 204 with the crucible body 206, the mold body 225 and the spacer 208 share a tilt axis. The heater crucible 204 having the crucible body 206 is placed within the first chamber 200. The spacer 208 is also placed within the first chamber 200. The spacer 208 includes an orifice 209 that is placed between the crucible body 206 and the mold body 225. The orifice 209 may be formed in a center of the spacer 208 to allow fluid flow to the mold body 225 from the crucible body 206. A center of the orifice 209 may be aligned with the tilt axis. In operation, the melted glass material in the crucible body 206 is allowed to flow to the mold body 225 through the orifice 209 in the spacer 208.

With respect to ZBLAN, a first side of the first chamber 200 may be used to melt the ZBLAN to a desired temperature, such as above about 800° C., plus or minus 50° C. via the heater crucible 204. When the centrifuge powder furnace 110 is turning or rotating, such as upon the plate 120, the rotation applies a centrifugal force resulting in a gravitational force greater than a micro-gravity force when in outer space. The heater crucible 204 is a high temperature furnace chamber and it is closest to the one side of the centrifuge powder furnace 110 within the first chamber 200. Once the ZBLAN is melted, the furnace 110 is mechanized to pour the ZBLAN into the second chamber 210 holding the mold body 225 at a much lower temperature such as, but not limited to, around 650° C. plus or minus 50° C., for it to cool into a preform mold 220. Pouring may be accomplished by the furnace being rotated and/or tilted along the tilt axis. This causes the molten ZBLAN to pour down into the mold body 225 and quickly cool to 650° C. More specifically, this may be performed by rotating and/or tilting the furnace in plane which will cause the molten ZBLAN to pour.

Thus, as shown in FIG. 1, a lifting and lowering mechanism 130 may be included to lift and lower (or rotate) each respective furnace 110a, 110b, 110c and 110d approximately 180 degrees with respect to the centrifuge plate 120. Therefore, the ZBLAN is first placed in the heater crucible 204 and/or placed in the first chamber 200 toward a first side closest to the insulation cap 202. Once heated and/or during heating the furnace system 100 is rotated by plate 120. The ZBLAN may then be placed within the second chamber 210 via mechanized pouring, the second chamber 210 which holds a mold body 225 into which the ZBLAN is placed for cooling. As shown with respect to FIG. 2, the ZBLAN material is heated in the non-mold chamber (i.e., the heater crucible 204 positioned on a first side of the first chamber 200), and when ZBLAN reaches a moldable state, the system 100, disclosed herein, is rotated or tilted forcing or pouring the melted ZBLAN material into the mold chamber (i.e., the mold body 225 in the second chamber 210 positioned on a second side of the first chamber 200). It then cools. The mold body 225 may be the container that houses the ZBLAN for later return to Earth.

Figure 3:
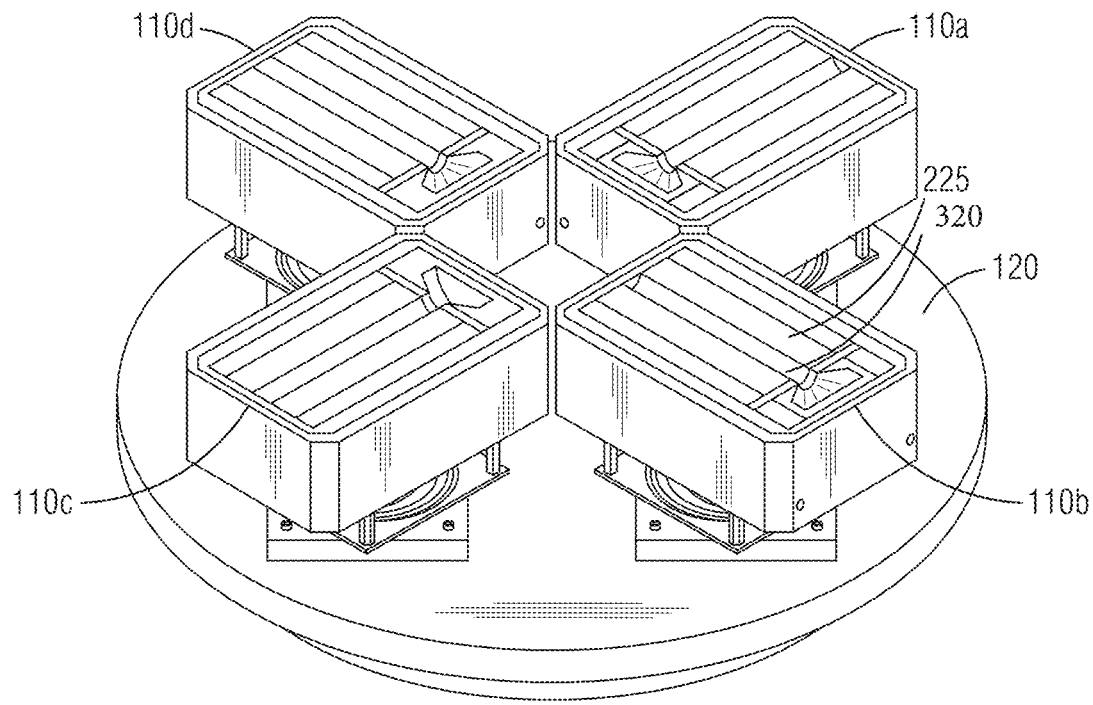
FIG. 3 shows a cross-sectional view of the embodiment of the plurality of centrifuge powder furnaces mounted on the centrifuge plate.

As shown in FIGS. 1 and 3, the second casing member 241 may be mounted to the centrifuge plate 120 via the lifting and lowering mechanism 130. The lifting and lowering mechanism 130 may include a bracket 133 that couples the second casing member 241 to the centrifuge plate 120 via a base element 135. The bracket 133 may be configured to pivot, tilt or rotate in opposite directions about base element 135. For example, pivoting the bracket 133 in one or first direction, the insulation cap 202 may be at a first elevation or angle and the insulation cap 212 may be at a second elevation above the first elevation. Pivoting the bracket 133 in another or a second direction, the insulation cap 202 may be at a third elevation or angle and insulation cap 212 may be at a fourth elevation below the third elevation. The insulation caps 202 and 212 may have varying elevation along the range of pivot, tilt or rotation. The pivot, tilt or rotation of the bracket 133 cause the tilt axis of the first chamber 200, the heater crucible 204 the second chamber 210, the mold body 225, and spacer 208 to change its angle relative to the plate 120.

The bracket 133 is shown to include legs, for example. At least two legs may be telescopic. For example, one pair of legs may telescope to lift one side of the furnace to allow for pouring. In another embodiment, all legs may be telescopic, but may operate in pairs to telescope or elevate the length of two of the legs simultaneously or alternatively, lower or extract pairs of legs that were previously elevated or raised.

In some embodiments, the bracket 133 may include a center post that can pivot the center of the casing to lift one side of the furnace, for example.

As shown, each furnace 110a-110d is enclosed to prohibit any powder or molten material escaping when in the micro-gravity environment. Thus, the complete process is accomplished with the ZBLAN being within an enclosed environment to prohibit contamination of the outer environment such as, but not limited to, a micro-gravity environment.

Though 180 degrees is discussed above, a pour may be provided where the rotation is less than 180 degrees such as, but not limited to, 90 degrees, 45 degrees, etc. A pour angle, which will also establish a pour rate may be based on a material placed within the furnace and desired property characteristics.

This furnace system 100 may be used for other materials and other temperature regimes. Thus, each furnace 110a-110d may be independently heated to different temperatures based on placement relative to the furnace elements, allowing multiple materials to be processed simultaneously. Each mold body 225 can also be independently heated or cooled in order to properly thermally treat a material.

FIG. 3 shows a top cross-sectional view of the embodiment of the plurality of centrifuge powder furnaces 110a, 110b, 110c and 110d mounted on the centrifuge plate. As shown, a preform mold 320 is formed in the mold body 225, which is provided within each chamber 110a-100d.

Figure 5:
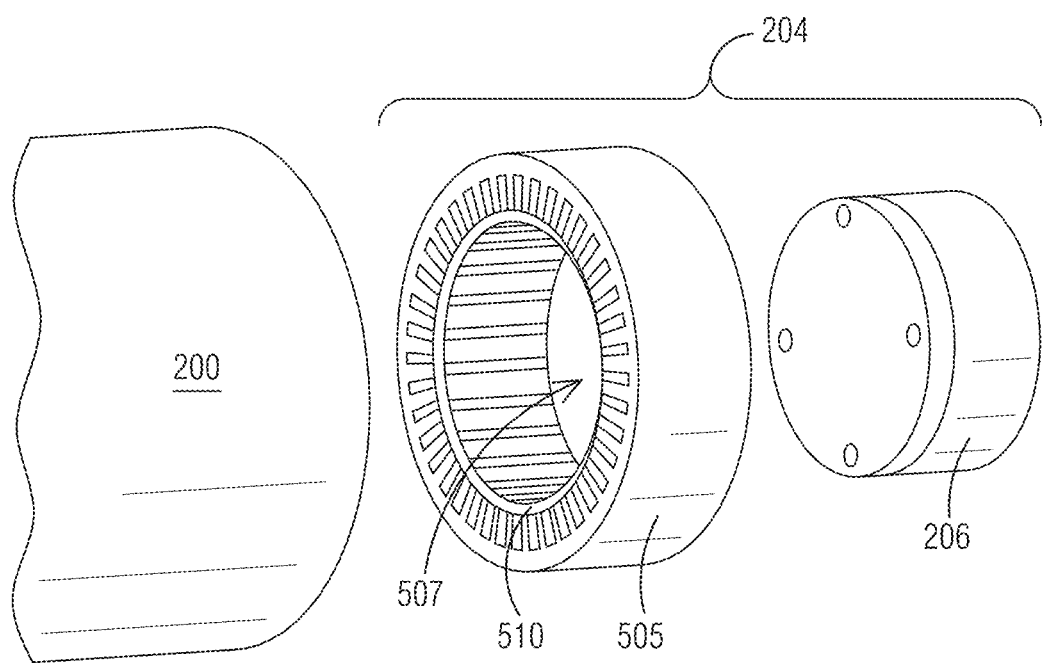
FIG. 5 shows a heater crucible of the furnace.

FIG. 5 shows a heater crucible 204 of the furnace. The heater crucible 204 includes a third chamber 505 having heating elements 510 lining an inner diameter of the third chamber 505. The third chamber 505 includes a hollow center 507. The inner diameter of the third chamber 505 may include heating elements 510 along the length and spaced around the inner surface. The third chamber 505 may be made of ceramic insulating material with the heating elements 510 supported by the ceramic material. The heating elements 510 are configured to be heated above about 800° C., plus or minus 50° C.

Both the second chamber 210 and the third chamber 505 are concentric and within the first chamber 200, but in side-by-side relation to allow for fluidic transfer of the molten material from the third chamber to the second chamber.

The heater crucible 204 may include the crucible body 206. The crucible body 206 may be received within the hollow center 507 of third chamber 505. The separating spacer 208 is placed between the crucible body 206 and the mold body 225 of preform mold 320 (FIG. 3). The heater crucible 204 heats the crucible body 206 so that the material within the crucible body 206 is heated above about 800° C., plus or minus 50° C., for example. Other temperatures may be used depending on the melting point of the material placed in the crucible body 206.

Figure 6:
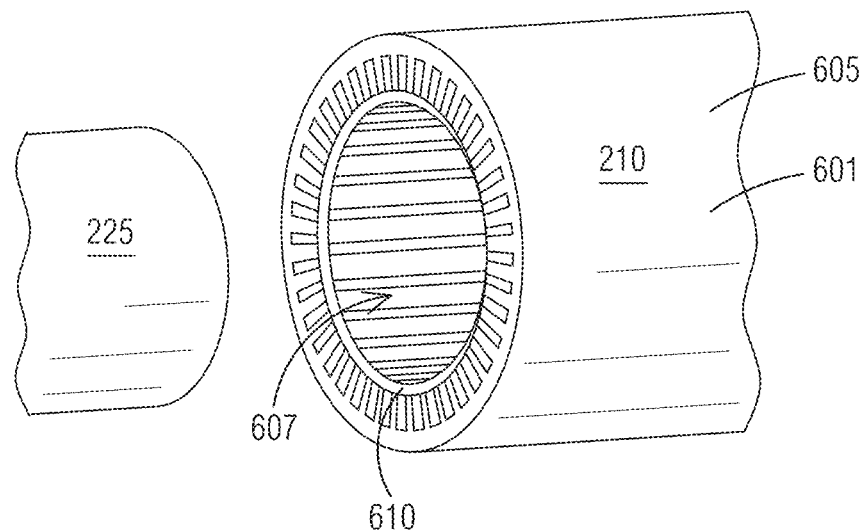
FIG. 6 shows a portion of the second chamber of the furnace.

FIG. 6 shows a portion 601 of the second chamber 210 of the furnace. The second chamber 210 comprises heating elements 610. The second chamber 210 may include a chamber body 605 having a hollow center 607. The inner diameter of the chamber body 605 may include heating elements 610 along the length of the chamber body 605 and spaced around the inner surface. The chamber body 605 may be made of ceramic material with the heating elements 610 supported by the ceramic material. The outer diameter of the mold body 225 is configured to be received in the chamber body 605.

Figure 4:
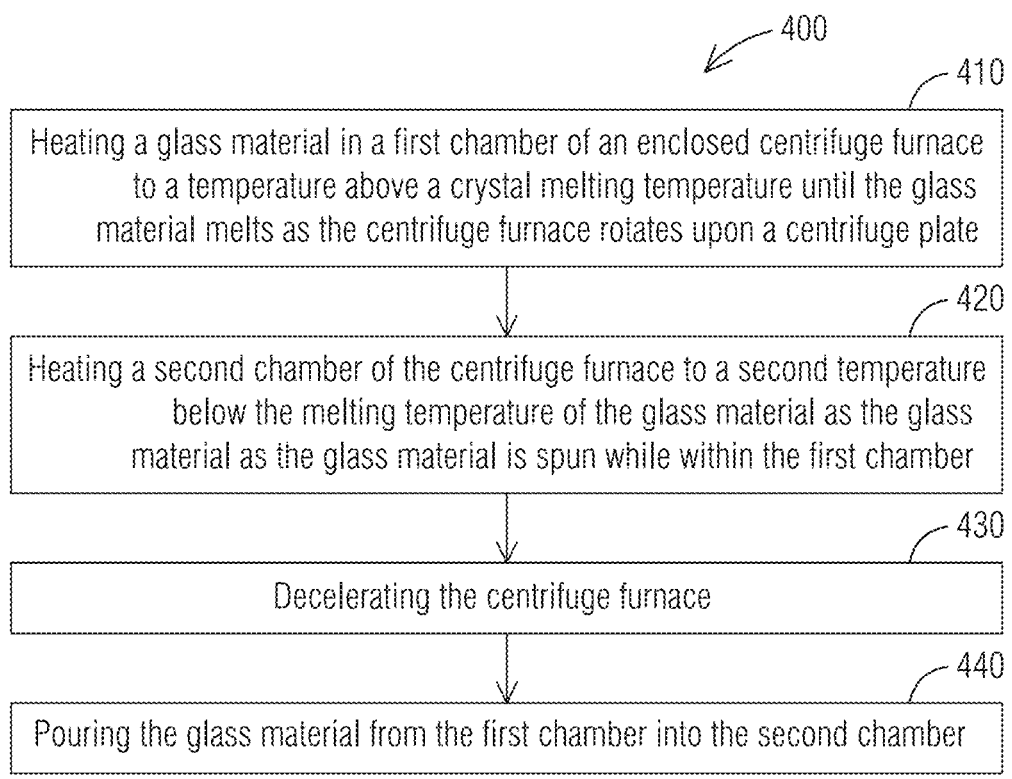
FIG. 4 shows an embodiment of a method.

FIG. 4 shows an embodiment of a method and will be described in relation to FIGS. 1, 2, 5 and 6. The method steps may be performed in the order shown or a different order.

One or more of the steps may be performed contemporaneously. One or more of the steps may be deleted in an iterations or steps added.

The method 400 comprises heating a glass material in a first chamber 200 of an enclosed centrifuge furnace 110 to a temperature above a crystal melting temperature until the glass material melts as the centrifuge furnace 110 rotates upon a centrifuge plate 120, at 410. By way of non-limiting example, the glass material may be placed in an interior cavity of the crucible body 206. The heater crucible 204 is concentric relative to the insulation body 201 of the first chamber 200. The crucible body 206 is concentric relative to and within the third chamber 505.

In some embodiments, heating the first chamber 200 may include tilting the first chamber 200 in a first direction, such that the tilt axis tilts the heater crucible 204 and the crucible body 206 at a first angle relative to the plate 120 so that the material remains in the crucible body 206 as the material becomes molten.

The method 400 further comprises heating a second chamber 210 of the centrifuge furnace 110 to a second temperature below the melting temperature of the glass material as the glass material is spun while within the first chamber 200, at 420. The method 400 further comprises decelerating the centrifuge furnace 110, at 430. The method 400 further comprises pouring the glass material from the third chamber within the first chamber 200 into the second chamber 210, at 440. As disclosed above, the furnace 110 may be placed at an angle or second angle to provide for pouring from the crucible body 206 in the first chamber 200 to the mold body 225 within the second chamber 210.

The method 400 may further comprise actuating the centrifuge furnace 110 as the glass material is poured from the first chamber 200 to the second chamber 210. The method 400 may further comprise turning off the first chamber 200 once the glass material is poured into the second chamber 210 to provide for the glass material to cool.

As disclosed above, for ZBLAN, the first chamber 200 of the furnace 110 may be at or above 800° C. where ZBLAN melts. The second chamber 210, which may be where a mold 320 is located, is simultaneously heated up to 650° C. After a set amount of time, the furnace 110 may rotate approximately 180 degrees. This causes the molten ZBLAN to pour down into the mold 320 of the mold body 225 and quickly cool to 650° C. A heating element 510 of the heater crucible 204 in the first chamber 200 is turned off and the ZBLAN is allowed to cool in the mold to form a blank preform. Once complete the centrifuge can be turned off.

In some embodiments, the method 400 may begin with turning the centrifuge powder furnace 110 so the high temperature furnace zone (i.e., first side of the first chamber 200) closest to one side of the furnace 110 is controlled to spin up to a predetermined speed. This forces the free-floating powder to settle into the high temperature furnace zone. After the powder is settled in the first side of the first chamber 200, the heating process of method 400 can begin by heating the heating elements 510 of the heater crucible 204. After the material is molten, the material can be subsequently molded and cooled on a second side of the first chamber 200 via a second chamber 210 concentric within the first chamber 200.

The system may include a plurality of furnaces. Therefore, the method 400, when heating the material in a first furnace (i.e., furnace 110a) at 410, may also include heating the material in other furnaces 110b, 110c and/or 110c, simultaneously, for example. The material may be the same or a different material in each furnace. Additionally, since each furnace is mounted to the plate 120, all of the furnaces of the system 100 are rotated simultaneously to create a centrifugal force therein. Accordingly, a second or other powdered materials is/are heated in a first chamber at a third or other temperature by a second or other enclosed centrifuge furnace, as the materials are spun. The third temperature may be the same temperature of the first temperature or a different temperature to melt the second or other powdered material.

Figure 7:
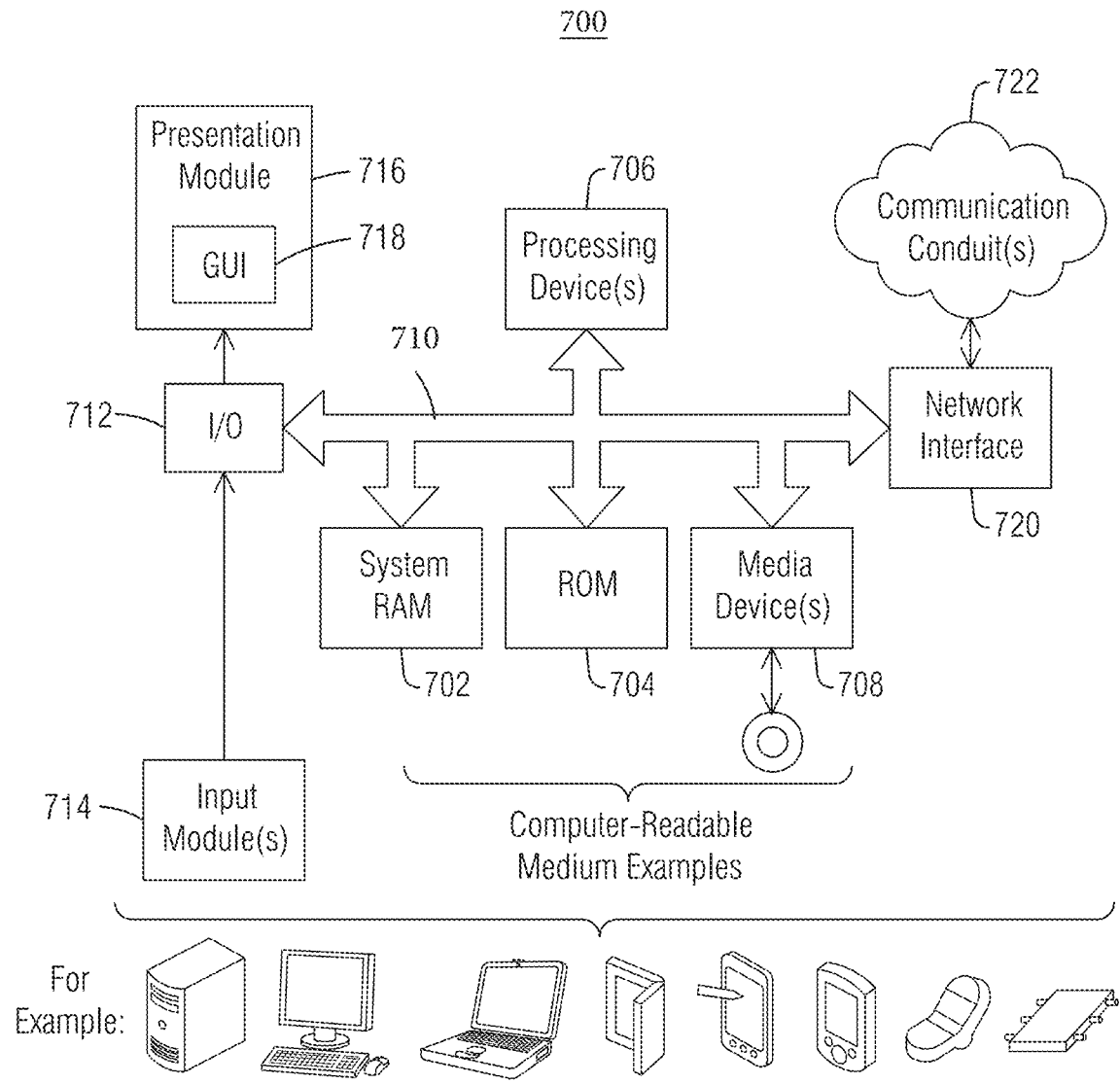
FIG. 7 shows an embodiment of a basic configuration of a computing device that may include any type of stationary computing device or a mobile computing device.

Referring now to FIG. 7, in a basic configuration, a computing device 700 may include any type of stationary computing device or a mobile computing device. The computing device 700 may be a part of the furnace discussed above to provide the process to, for example, but not limited to, provide centrifugal force speeds, timing for heating the glass material, a rate of pour of the glass material, and a cooling time, and pouring the glass material, as disclosed above. The computing device 700 may also control the pivot, tilt or rotation timing and tilt angle of the tilt axis. The system 100 may include one or more computing devices 700. If one computing device 700 is used, the computing device 700 may control all furnaces 110a-110d, for example.

The computing device 700 may include one or more processing devices 706 and system memory in a hard drive. Depending on the exact configuration and type of computing device 700, system memory may be volatile (such as RAM 702), non-volatile (such as read only memory (ROM 704), flash memory, and the like) or some combination of the two. A system memory may store an operating system, one or more applications, and may include program data for performing turning on and off the furnaces, rotation to create centrifugal force speeds, tilt control, and power managements operations such as for space operations.

The computing device 700 may carry out one or more blocks of a process in FIG. 4 described herein. The computing device 700 may also have additional features or functionality. As a non-limiting example, the computing device 700 may also include additional data storage media devices 708 (removable and/or non-removable) such as, for example, magnetic disks, optical disks, or tape. The computer storage media devices 708 may include volatile and non-volatile, non-transitory, removable, and non-removable media implemented in any method or technology for storage of data, such as computer readable instructions, data structures, program modules or other data. The system memory, removable storage and non-removable storage are all non-limiting examples of computer storage media. The computer storage media may include, but is not limited to, RAM 702, ROM 704, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

The computing device 700 may also include or have input/output (I/O) interfaces 712 for input modules 714 such as a keyboard, mouse, pen, voice input device, touch input device, etc. The computing device may include or have I/O interfaces 712 for connection to output device(s) such as a display, a presentation module 716, speakers, etc. A graphical user interface (GUI) 718 may be displayed on the presentation module 716. The computing device 700 may include a peripheral bus 710 for connecting to peripherals. Computing device 700 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 700 may include a network interfaces 720, such as a network interface card to connect (wired or wireless) to a network or other communication conduits 722.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM, and a flash memory. Otherwise, the code can be stored in a tangible computer-readable storage medium such as a magnetic tape, a flexible disc, a hard disc, a compact disc, a photo-magnetic disc, and a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

A general-purpose computer, or microprocessor, may be programmed to carry out the algorithm/steps for creating a new machine. The general-purpose computer becomes a special purpose computer once it is programmed to perform particular functions pursuant to instructions from program software of the embodiments described herein. The instructions of the software program that carry out the algorithm/steps electrically change the general-purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:
1. A method comprising:
heating a powdered material in a first chamber at a first temperature by an enclosed centrifuge furnace having with the first chamber, a second chamber and a third chamber all of which include and share a tilt axis, the third chamber being concentric with the first chamber and operable at the first temperature to melt the material within the first chamber;

rotating the furnace by a first mechanism to rotate the first, second and third chambers, simultaneously, to create a centrifugal force to maintain the material within the third chamber as the centrifugal force is applied;

pouring the melted material from the third chamber into the second chamber;

heating the material to a second temperature by the second chamber, the second chamber being concentric with the first chamber and the second temperature lower than the first temperature; and cooling the material within the first chamber.

2. The method of claim 1, further comprising, prior to the pouring of the melted material, deactivating the rotating of the furnace.

3. The method of claim 2, wherein the pouring of the melted material comprises:

tilting the furnace by a second mechanism to position the tilt axis of the third chamber and the second chamber at an angle which causes the melted material to pour from the third chamber into the second chamber.

4. The method of claim 1, wherein the first temperature is 800° C., plus or minus 50° C., the second temperature is 650° C., plus or minus 50° C., and the material is ZBLAN glass.

5. The method of claim 1, wherein the enclosed centrifuge furnace is a first enclosed centrifuge furnace and further comprising:

heating a second powdered material at a third temperature by a second enclosed centrifuge furnace, the second furnace being different from the first furnace and includes a first chamber; and rotating the second furnace by the first mechanism to simultaneously to create the centrifugal force in the first chamber of the second furnace and the first chamber of the first furnace.

* * * * *